United States Patent
Hu et al.

(10) Patent No.: US 12,487,422 B2
(45) Date of Patent: Dec. 2, 2025

(54) OPTICAL-FIBER-EMBEDDED AND FRP-WRAPPED SMA COMPOSITE BAR WITH FORCE SENSING, STRESS DRIVING AND STRUCTURAL REINFORCEMENT INTEGRATED

(71) Applicant: Shenzhen University, Shenzhen (CN)

(72) Inventors: Biao Hu, Shenzhen (CN); Yingwu Zhou, Shenzhen (CN); Zenghui Ye, Shenzhen (CN); Feng Xing, Shenzhen (CN); Xiaoxu Huang, Shenzhen (CN); Zhenyu Huang, Shenzhen (CN)

(73) Assignees: SHENZHEN UNIVERSITY, Guangdong (CN); JINAN UNIVERSITY, Guangdong (CN)

( * ) Notice: Subject to any disclaimer, the term of this patent is extended or adjusted under 35 U.S.C. 154(b) by 0 days.

(21) Appl. No.: 18/973,437

(22) Filed: Dec. 9, 2024

(65) Prior Publication Data
US 2025/0223806 A1   Jul. 10, 2025

(30) Foreign Application Priority Data
Jan. 10, 2024   (CN) .......................... 202410036451.4

(51) Int. Cl.
*G02B 6/44*   (2006.01)
*E04C 5/07*   (2006.01)
(Continued)

(52) U.S. Cl.
CPC .............. *G02B 6/4415* (2013.01); *E04C 5/07* (2013.01); *E04C 5/08* (2013.01); *G01L 1/00* (2013.01);
(Continued)

(58) Field of Classification Search
CPC .. G02B 6/02033; G02B 6/4415; G02B 6/443; G01L 1/00; G01L 1/242
See application file for complete search history.

(56) References Cited

U.S. PATENT DOCUMENTS

| | | | |
|---|---|---|---|
| 2012/0163758 A1* | 6/2012 | McCullough | H01B 3/427 385/101 |
| 2025/0199258 A1* | 6/2025 | Zhou | G02B 6/4484 |

FOREIGN PATENT DOCUMENTS

| | | |
|---|---|---|
| CN | 111070735 A | 4/2020 |
| CN | 115262862 A | 11/2022 |

OTHER PUBLICATIONS

Chinese Patent Office Decision to Grant from application No. 202410036451.4 dated Aug. 19, 2024, 3 pgs.
(Continued)

*Primary Examiner* — Daniel Petkovsek
(74) *Attorney, Agent, or Firm* — Tutunjian & Bitetto, P.C.

(57) ABSTRACT

The present disclosure relates to an optical-fiber-embedded and FRP-wrapped SMA composite bar with force sensing, stress driving, and structural reinforcement integrated. The surface of the plain round Fe-SMA bar is provided with a groove in advance for implantation of the sheathed optical cable such that the bar has a self-sensing function. The plain round Fe-SMA bar having a shape memory effect is used as a steel core, so it has the characteristic of self-tensioning; an FRP wrapping layer prevents corrosion of the plain round Fe-SMA bar used as the core and prevents fracture of the sheathed optical cable, thus improving the durability of a prestressed bar structures on the outer surface of the FRP wrapping layer may provide sufficient engaging force and anchoring effect, reducing loss of prestress due to friction and the like.

4 Claims, 5 Drawing Sheets

(51) Int. Cl.
    *E04C 5/08*     (2006.01)
    *G01L 1/00*     (2006.01)
    *G01L 1/24*     (2006.01)
    *G02B 6/02*     (2006.01)

(52) U.S. Cl.
    CPC .............. *G01L 1/242* (2013.01); *G02B 6/443* (2013.01); *G02B 6/02033* (2013.01)

(56) References Cited

OTHER PUBLICATIONS

Chinese Patent Application No. 202410036451.4 First Office Action, dated Jun. 13, 2024, 14 pgs.

\* cited by examiner

OPTICAL-FIBER-EMBEDDED AND FRP-WRAPPED SMA COMPOSITE BAR WITH FORCE SENSING, STRESS DRIVING AND STRUCTURAL REINFORCEMENT INTEGRATED

CROSS-REFERENCE TO RELATED APPLICATION

This patent application claims the benefit and priority of Chinese Patent Application No. 202410036451.4 filed with the China National Intellectual Property Administration on Jan. 10, 2024, the disclosure of which is incorporated by reference herein in its entirety as part of the present application.

TECHNICAL FIELD

The present disclosure belongs to the technical field of building materials, and particularly relates to an optical-fiber-embedded and fiber-reinforced polymer (FRP)-wrapped shape memory alloy (SMA) composite bar with force sensing, stress driving and structural reinforcement integrated.

BACKGROUND

A prestressed concrete structure can effectively limit cracks in reinforced concrete to improve the structural durability, stiffness and bearing capacity so that it is a structure with extensive development potential and excellent performance. Prestressed concrete technology is widely used in bridges and large-span space structures. A steel-continuous fiber composite bar is a high-performance material composed of a reinforcement core and a fiber reinforced polymer covering layer, has the advantages such as high strength, corrosion resistance, and stable secondary stiffness, so that it can significantly improve the structural durability and mechanical properties. However, the problems existing when the steel-continuous fiber composite bar is used in the prestressed concrete structure are as follows: 1. As fibers arranged outside of the steel-continuous fiber composite bar are a brittle material, the anchoring effect and control of prestress will be affected by stress concentration generated during use of a traditional external prestressing method; 2. There is a great loss of prestress during use of the traditional prestressing method, and the loss of prestress is complicated in modes and difficult to monitor, which is prone to cause under-tensioning or over-tensioning.

SUMMARY

In view of this, an objective of the present disclosure is to provide an optical-fiber-embedded and FRP-wrapped SMA composite bar with force sensing, stress driving and structural reinforcement integrated. The optical-fiber-embedded and FRP-wrapped SMA composite bar provided in the present disclosure has the advantages of being self-driven, self-sensing, and low loss of prestress, and is a stress material applicable to the application of prestress and the monitoring of the loss of prestress of various engineering components.

In order to achieve the above objective, the present disclosure proposes the following technical solutions:

The present disclosure provides an optical-fiber-embedded and FRP-wrapped SMA composite bar with force sensing, stress driving and structural reinforcement integrated, which includes: a sheathed optical cable, a plain round Fe-SMA bar, an FRP wrapping layer and tight jackets.

The sheathed optical cable includes a glass fiber core, a polyimide coating and a polyurethane covering layer nested from inside to outside.

The plain round Fe-SMA bar is provided with a groove in a length direction thereof; the sheathed optical cable is embedded in parallel in the groove.

The FRP wrapping layer is wrapped around an outer surface of the plain round Fe-SMA bar, and the FRP wrapping layer is made of an epoxy resin composite fiber.

The tight jackets include a first tight jacket and a second tight jacket that respectively sleeve at positions where the FRP wrapping layer and two ends of the sheathed optical cable are jointed.

Rib structures are formed on an outer surface of the FRP wrapping layer.

Preferably, the sheathed optical cable has a diameter of less than 1 mm.

Preferably, a length of the sheathed optical cable is greater than a length of the plain round Fe-SMA bar, the sheathed optical cable extends from two ends of the plain round Fe-SMA bar, and portions, extending from the two ends of the plain round Fe-SMA bar, of the sheathed optical cable are sleeved with corrugated casings.

Preferably, the groove is a square groove of 1 mm×1 mm.

Preferably, each of the rib structures is formed by wrapping a fiber bundle.

Preferably, each of the rib structures has a width of 5 mm, a height of 2 mm, and a spacing between adjacent rib structures is 5 mm.

The present disclosure further provides a preparation method for an optical-fiber-embedded and FRP-wrapped SMA composite bar according to the above technical solutions, which includes the following steps:

slotting the plain round Fe-SMA bar in the length direction of the plain round Fe-SMA bar to form the groove;

fixing the sheathed optical cable in parallel in the groove, then wrapping the plain round Fe-SMA bar with the epoxy resin composite fiber, and performing fixation to obtain the plain round Fe-SMA bar wrapped with the FRP wrapping layer;

sleeving the tight jackets from the sheathed optical cable and on two ends of the FRP wrapping layer, and finally arranging rib structures on the outer surface of the FRP wrapping layer to obtain the optical-fiber-embedded and FRP-wrapped SMA composite bar;

the sheathed optical cable 6 extending from two ends of the plain round Fe-SMA bar.

Preferably, a method for fixation includes: fixing the sheathed optical cable with adhesive tape and then encapsulating the groove with glue.

Preferably, the preparation method further includes: sleeving portions, extending from two ends of the plain round Fe-SMA bar, of the sheathed optical cable with corrugated casings.

The present disclosure further provides an application of an optical-fiber-embedded and FRP-wrapped SMA composite bar according to the above technical solutions or an optical-fiber-embedded and FRP-wrapped SMA composite bar prepared by a preparation method according to the above technical solutions in a prestressed concrete structure.

The present disclosure provides an optical-fiber-embedded and FRP-wrapped SMA composite bar, which includes: a sheathed optical cable, a plain round Fe-SMA bar, an FRP wrapping layer and a tight jacket; where the sheathed optical cable includes a glass fiber core, a polyimide coating and a polyurethane covering layer nested from inside to outside; the plain round Fe-SMA bar is provided with a groove in a length direction; the sheathed optical cable is embedded in parallel in the groove; the FRP wrapping layer is wrapped around the outer surface of the plain round Fe-SMA bar, and the FRP wrapping layer is made of an epoxy resin composite fiber; the tight jacket includes a first tight jacket and a second tight jacket that respectively sleeve over joints between the FRP wrapping layer and two ends of the sheathed optical cable; and the FRP wrapping layer has a rib structure on its outer surface.

According to the present disclosure, the surface of the plain round Fe-SMA bar is provided with a groove in advance for implantation of the sheathed optical cable such that the bar has a self-sensing function, i.e., the bar is "smart", ensuring the control of prestress in its tensioning process and the monitoring of the loss of prestress during its normal use. The optical-fiber-embedded and FRP-wrapped SMA composite bar obtained is different from the traditional steel-continuous fiber intelligent bar. In the present disclosure, the plain round Fe-SMA bar is used as a steel core, which has a shape memory effect, i.e., it cannot recover on its own after pre-stretching at room temperature but can be recovered after being activated at a specific heating temperature. This property determines that the optical-fiber-embedded and FRP-wrapped SMA composite bar is self-driven. The fiber wrapped on the surface of the slotted plain round Fe-SMA bar implanted with the sheathed optical cable may form the FRP wrapping layer to prevent corrosion of the plain round Fe-SMA bar used as the core and prevent fracture of the sheathed optical cable, thus improving the durability of a prestressed bar. The rib structures on the surface of the FRP wrapping layer may provide sufficient engaging force and anchoring effect, thus achieving uniform distribution of prestress during the application and reducing the loss of prestress due to friction and the like. Therefore, according to the present disclosure, the optical-fiber-embedded and FRP-wrapped SMA composite bar has the characteristics of being self-driven, self-sensing, and low loss of prestress, overcomes the defects of the existing steel-continuous fiber composite bar, such as great loss of prestress, low anchoring efficiency, low control precision of tensioning prestress, and complicated construction, and is a stress material applicable to the application of prestress and the monitoring of the loss of prestress of various complex engineering components. Moreover, according to the present disclosure, the optical-fiber-embedded and FRP-wrapped SMA composite bar is resistant to corrosion, has high strength and high precision, is easy to construct, can be applied in engineering, and is suitable for large-scale promotion.

Figure 7:
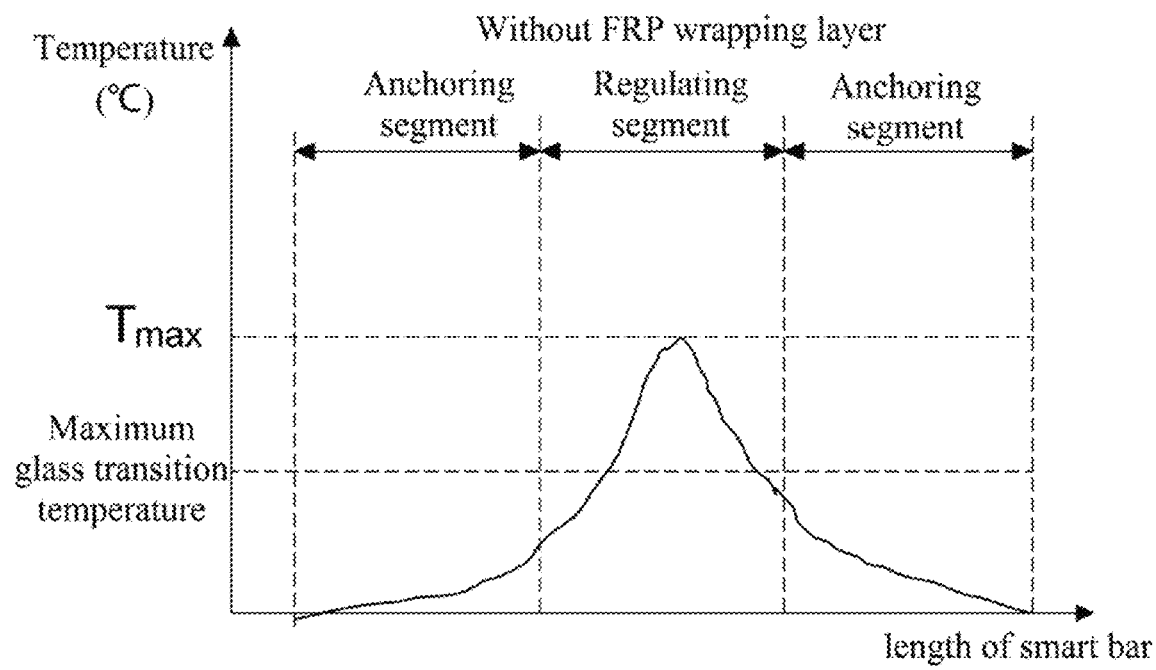
Figure 8:
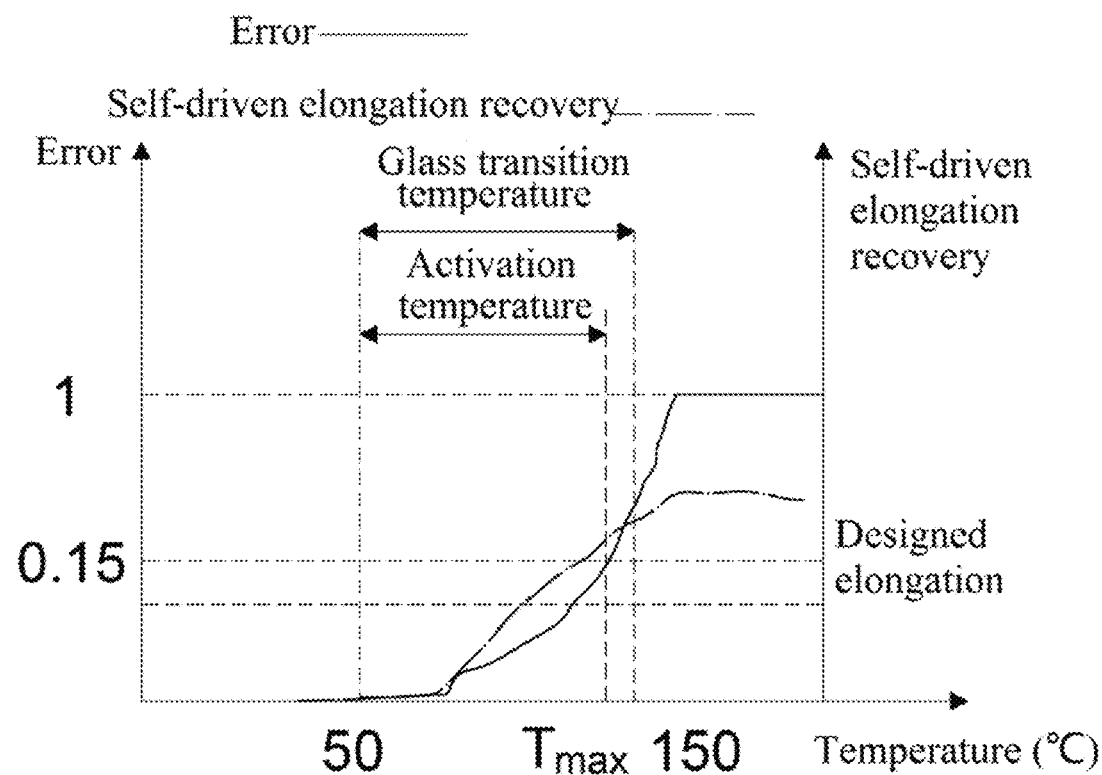
Figure 9:
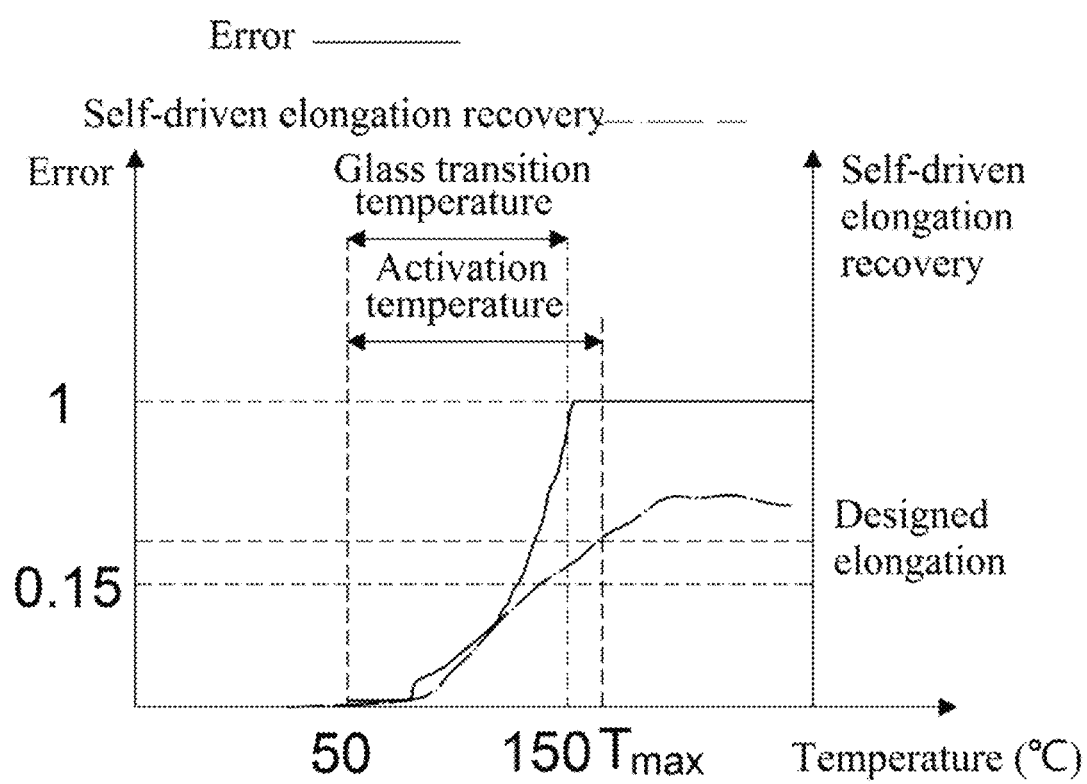
Figure 10:
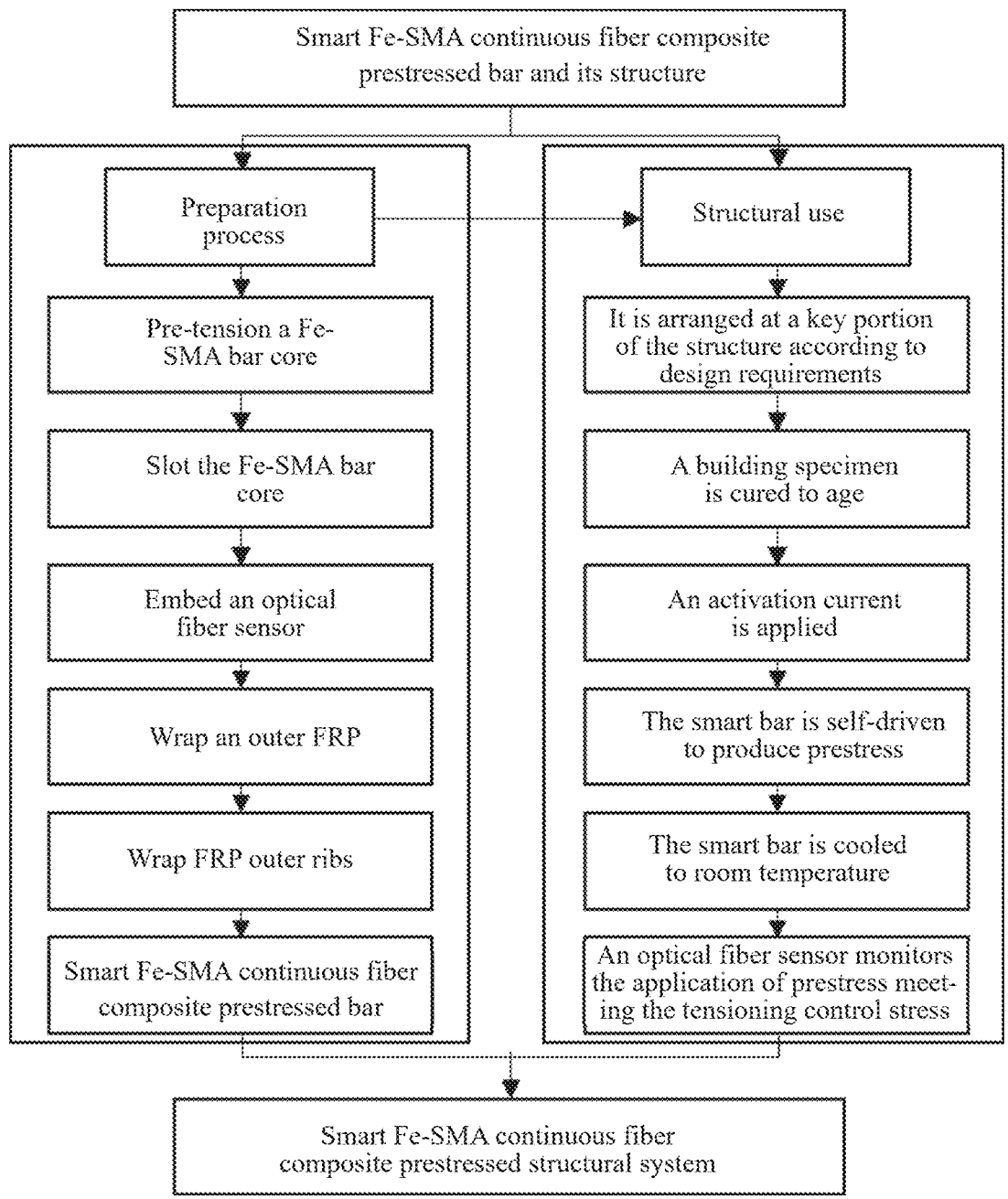

wherein 1 glass fiber core, 2 polyimide coating, 3 polyurethane covering layer, 5 plain round Fe-SMA bar, 6 sheathed optical cable, 7 corrugated casing, 8 FRP wrapping layer, 9 tight jacket, and 10 large-resistance coating;

FIG. 7 is a temperature distribution graph of the optical-fiber-embedded and FRP-wrapped SMA composite bar provided with the large-resistance coating;

FIG. 8 is a relationship diagram of the glass transition temperature of FRP and activation temperature when conditions are met;

FIG. 9 is a relationship diagram of the glass transition temperature of FRP and activation temperature when conditions are not met; and FIG. 10 is a flow chart of the preparation and application of an optical-fiber-embedded and FRP-wrapped SMA composite bar in the present disclosure.

DETAILED DESCRIPTION OF THE EMBODIMENTS

As shown in FIG. 1 to FIG. 6, the present disclosure provides an optical-fiber-embedded and FRP-wrapped SMA composite bar with force sensing, stress driving and structural reinforcement integrated including a sheathed optical cable 6, a plain round Fe-SMA bar 5, an FRP wrapping layer 8 and tight jackets 9; where the sheathed optical cable 6 includes a glass fiber core 1, a polyimide coating 2 and a polyurethane covering layer 3 which are nested from inside to outside;

the plain round Fe-SMA bar 5 is provided with a groove 4 in a length direction of the plain round Fe-SMA bar 5; the sheathed optical cable 6 is embedded in parallel in the groove 4;

the FRP wrapping layer 8 is wrapped around the outer surface of the plain round Fe-SMA bar 5, and the FRP wrapping layer 8 is made of an epoxy resin composite fiber;

the tight jackets 9 include a first tight jacket and a second tight jacket that respectively sleeve at positions where FRP wrapping layer 8 and two ends of the sheathed optical cable 6 are joined; and rib structures are formed on the outer surface of the FRP wrapping layer 8.

If not otherwise specified, the present disclosure has no special requirements for sources of raw materials used, as long as the sources of raw materials used are commercially available goods well known to those skilled in the art.

According to the present disclosure, the optical-fiber-embedded and FRP-wrapped SMA composite bar includes: a sheathed optical cable 6. In the present disclosure, the sheathed optical cable 6 includes a glass fiber core 1, a polyimide coating 2 and a polyurethane covering layer 3 which are nested from inside to outside; and the sheathed optical cable 6 has a diameter preferably less than 1 mm, more preferably less than 0.9 mm. The present disclosure has no special limitation on the type of the sheathed optical cable, as long as the sheathed optical cable are well known in the field. The sheathed optical cable whose diameter is within the range above can avoid the influence on the mechanical properties of the bar implanted with the sheathed optical cable.

Figure 1:
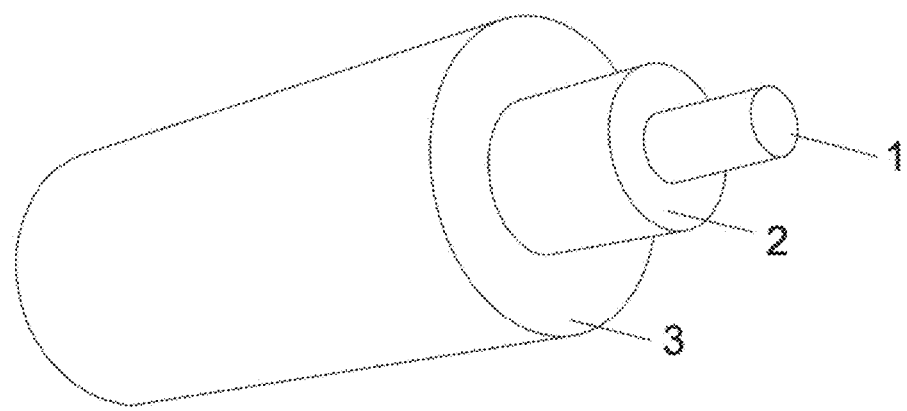
FIG. 1 is a structural schematic diagram of a sheathed optical cable in the present disclosure.

In the present disclosure, the sheathed optical cable 6 has a structure as shown in FIG. 1. As shown in FIG. 1, the sheathed optical cable 6 has the glass fiber core 1 in the center, the glass fiber core 1 is covered with the polyimide coating 2, and the polyimide coating 2 is covered with the polyurethane covering layer 3.

According to the present disclosure, the optical-fiber-embedded and FRP-wrapped SMA composite bar includes: a plain round Fe-SMA bar 5. In the present disclosure, the plain round Fe-SMA bar is a commercially available good. The present disclosure has no special limitation on the diameter and strength of the plain round Fe-SMA bar, which can be selected and produced according to the actual engineering requirements. The diameter of the plain round Fe-SMA bar is preferably 8 mm, 10 mm or 14 mm.

In the present disclosure, the plain round Fe-SMA bar 5 is formed with a groove 4 in a length direction thereof; the groove 4 is preferably a square groove of 1 mm×1 mm; the number of the groove 4 is preferably great than or equal to 1, more preferably 1; the sheathed optical cable 6 is embedded in parallel in the groove 4; and the number of the sheathed optical cable is preferably great than or equal to 1, more preferably 1. In the present disclosure, the position and number of the groove on the plain round Fe-SMA bar and the number of the implanted sheathed optical cable may be selected according to actual requirements.

In the present disclosure, the size of the groove 4 is preferably greater than the size of the sheathed optical cable 6.

Figure 2:
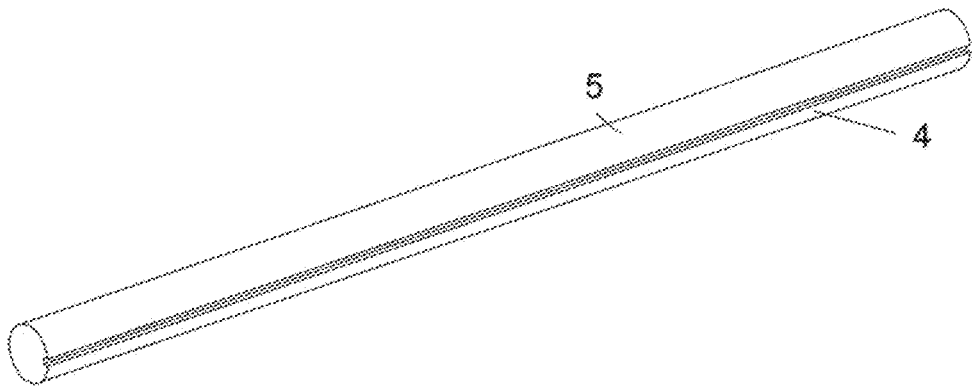
FIG. 2 is a schematic diagram of a plain round Fe-SMA bar with a groove in the present disclosure.

In the present disclosure, the plain round Fe-SMA bar 5 has a structure as shown in FIG. 2. As shown in FIG. 2, the plain round Fe-SMA bar 5 is provided with the groove 4 in the length direction thereof.

In the present disclosure, the length of the sheathed optical cable 6 is preferably greater than the length of the plain round Fe-SMA bar 5, the sheathed optical cable 6 extends form two ends of the plain round Fe-SMA bar 5, and portions, extending from the two ends of the plain round Fe-SMA bar 5, of the sheathed optical cable 6 are preferably sleeved with corrugated casings 7.

Figure 3:
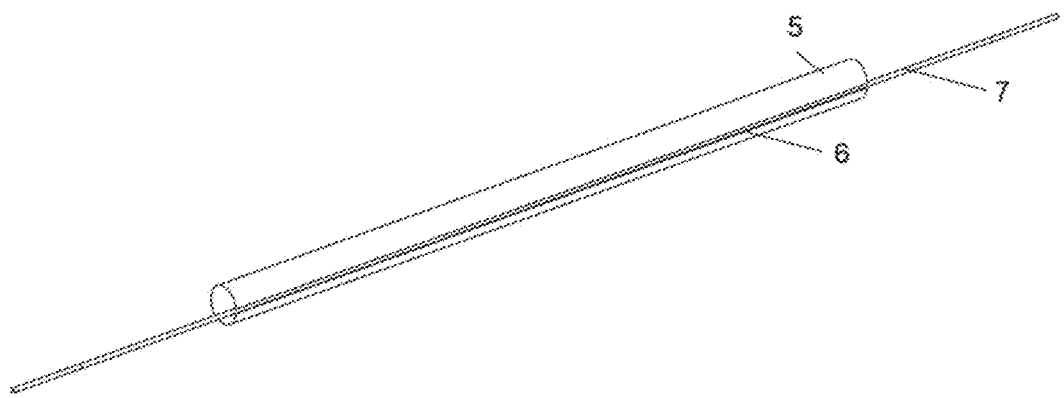
FIG. 3 is a schematic diagram of a sheathed optical cable, portions of which extend from two ends of the plain round Fe-SMA bar and are sleeved with corrugated casings in the present disclosure.

In the present disclosure, FIG. 3 shows a sheathed optical cable, portions of which extend from two ends of the plain round Fe-SMA bar and are sleeved with corrugated casings end. As shown in FIG. 3, the corrugated casings sleeve on the portions of the sheathed optical cable extending from the two ends of the plain round Fe-SMA bar and enter the groove in a certain distance.

According to the present disclosure, the optical-fiber-embedded and FRP-wrapped SMA composite bar includes: an FRP wrapping layer 8. In the present disclosure, the FRP wrapping layer 8 is wrapped around the outer surface of the plain round Fe-SMA bar 5, and the FRP wrapping layer 8 is made of an epoxy resin composite fiber; and the thickness of the FRP winding layer is preferably in a range of 1 mm to 3 mm, more preferably 2 mm. The thickness of the FRP wrapping layer may be determined by those skilled in the art according to the actual situation.

Figure 4:
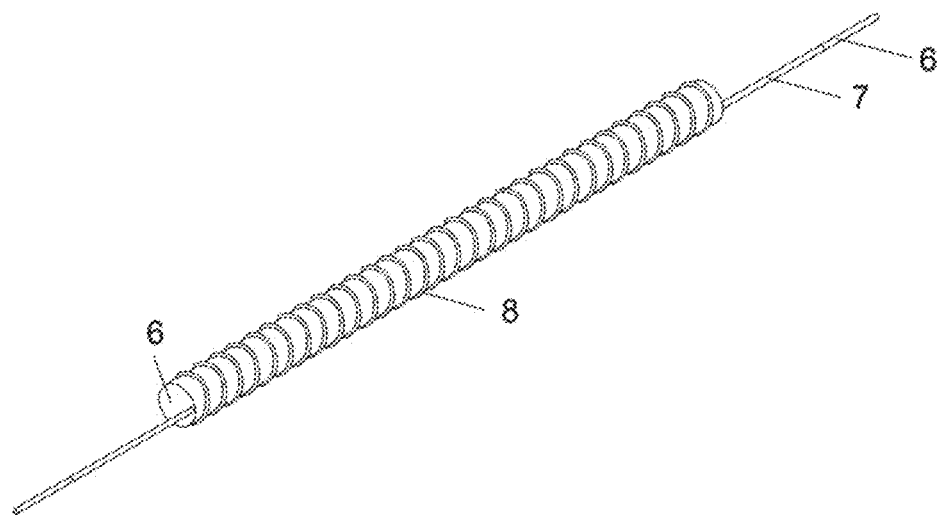
FIG. 4 is a schematic diagram of a plain round Fe-SMA bar with an FRP wrapping layer in the present disclosure.

The plain round Fe-SMA bar with the FRP wrapping layer in the present disclosure has a structure as shown in FIG. 4. As can be seen from FIG. 4, the epoxy resin composite fiber is wrapped around the outer surface of the plain round Fe-SMA bar to form the FRP wrapping layer.

According to the present disclosure, the optical-fiber-embedded and FRP-wrapped SMA composite bar includes: tight jackets 9. In the present disclosure, the tight jackets 9 include a first tight jacket and a second tight jacket that respectively sleeve at positions where the FRP wrapping layer 8 and two ends of the sheathed optical cable 6 are joined. In the present disclosure, the tight jackets 9 sleeve on two ends of the FRP wrapping layer 8 at 20 mm; and the tight jacket 9 is preferably at least 50 mm shorter than the sheathed optical cable 6.

Figure 5:
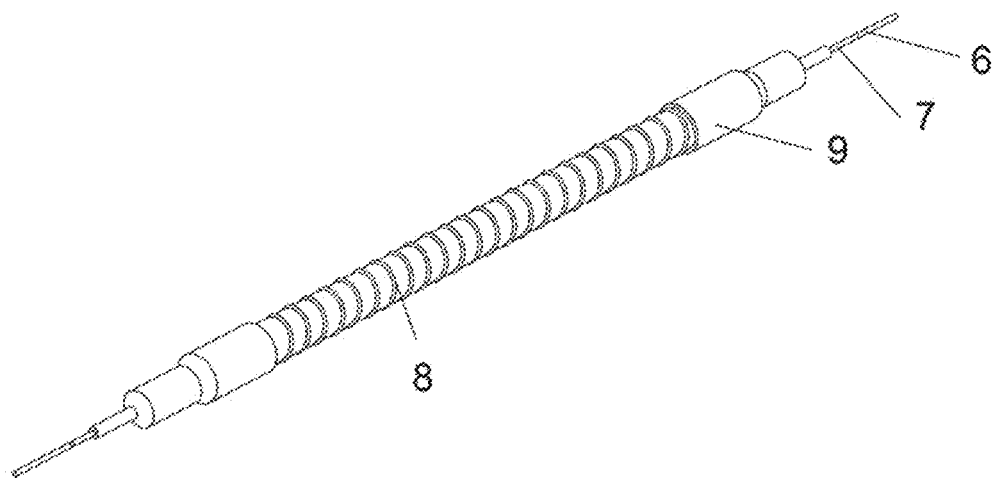
FIG. 5 is a schematic diagram of an optical-fiber-embedded and FRP-wrapped SMA composite bar in the present disclosure.

The optical-fiber-embedded and FRP-wrapped SMA composite bar in the present disclosure has a structure as shown in FIG. 5. As can be seen from FIG. 5, the tight jackets sleeve from two ends of the sheathed optical cable and on parts of the wrapping layer.

In the present disclosure, the FRP wrapping layer 8 is arranged with rib structures on the outer surface thereof; and the rib structure is preferably formed by wrapping of a fiber bundle. In the present disclosure, the rib structure has a width of 5 mm, a height of 2 mm, and a spacing between adjacent rib structures is 5 mm, preferably. According to the present disclosure, the rib structures arranged on the surface of the optical-fiber-embedded and FRP-wrapped SMA composite bar have a sufficient anchoring effect, so that the anchoring efficiency of the bar and concrete can be ensured and the loss of prestress can be reduced in the self-driven tensioning process.

The optical-fiber-embedded and FRP-wrapped SMA composite bar according to the present disclosure preferably further includes: anchoring members that may be provided at the ends of the optical-fiber-embedded and FRP-wrapped SMA composite bar to replace the rib structures. The anchoring members preferably are steel sleeve anchoring members.

Figure 6:
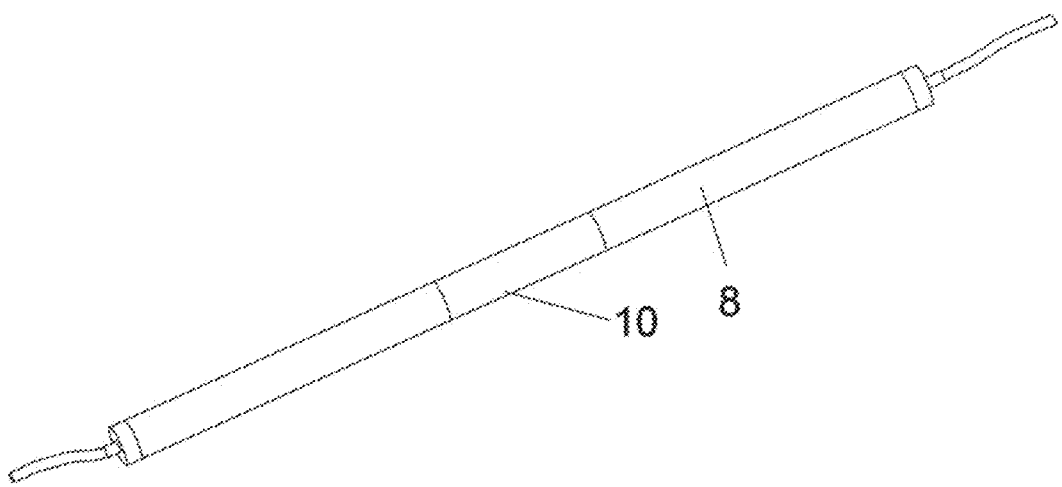
FIG. 6 is a schematic diagram of an optical-fiber-embedded and FRP-wrapped SMA composite bar provided with a large-resistance coating in the present disclosure.

FIG. 6 is a schematic diagram of an optical-fiber-embedded and FRP-wrapped SMA composite bar provided with a large-resistance coating in the present disclosure. As shown in FIG. 6, the optical-fiber-embedded and FRP-wrapped SMA composite bar according to the present disclosure preferably further includes: a portion of the plain round Fe-SMA bar 5 which is located in the middle of the plain round Fe-SMA bar 5, has a length of 50 mm, is not covered with the FRP wrapping layer 8, and is coated with the large-resistance coating 10 to replace the FRP wrapping layer 8. The thickness of the large-resistance coating 10 is preferably 15 μm; the large-resistance coating 10 is preferably made of a graphene carbon nanotube composite water-based conductive material; the graphene carbon nanotube composite water-based conductive material has a model of TF-H-001, and are purchased from Suzhou Tanfeng Graphene Technology Co. Ltd. The present disclosure has no special limitation on the coating process, as long as the coating process is well known in the art.

The large-resistance coating has a function to allow a region of the Fe-SMA bar with the large-resistance coating to have a higher activation temperature in advance when an activation current is applied, and the region of the Fe-SMA bar with the large-resistance coating serves as a designed self-driven elongation recovery regulating segment. The region of the Fe-SMA bar covered with the FRB wrapping layer 8 has a temperature lower than a maximum glass transition temperature and serves as an anchoring segment. FIG. 7 shows the temperature distribution of the optical-fiber-embedded and FRP-wrapped SMA composite bar provided with the large-resistance coating.

The present disclosure further provides a preparation method for an optical-fiber-embedded and FRP-wrapped SMA composite bar according to the above technical solutions, which includes the following steps:

a plain round Fe-SMA bar 5 is slotted in a length direction thereof to form a groove 4;

a sheathed optical cable 6 is fixed in parallel in the groove 4, the plain round Fe-SMA bar 5 is wrapped with an epoxy resin composite fiber, and fixation is performed to obtain the plain round Fe-SMA bar 5 wrapped with an FRP wrapping layer 8;

the tight jackets 9 are sleeved from the sheathed optical cable 6 and on two ends of the FRP wrapping layer 8, and finally rib structures are arranged on the outer surface of the FRP wrapping layer 8 to obtain the optical-fiber-embedded and FRP-wrapped SMA composite bar;

the sheathed optical cable 6 extending from two ends of the plain round Fe-SMA bar 5.

According to the present disclosure, the plain round Fe-SMA bar 5 is slotted in the length direction thereof to form the groove 4.

Before slotting, the preparation method according to the present disclosure preferably further includes: the plain round Fe-SMA bar 5 is per-tensioned according to a designed pre-tensioning strain; the elongation of the pre-tensioned plain round Fe-SMA bar 5 is preferably from 2% to 6%, more preferably from 3% to 5%.

In the present disclosure, the slotting is preferably carried out with a metal slotting machine. The present disclosure has no special limitation on the slotting process, as long as the grooving process is well-known in the art.

According to the present disclosure, after the groove 4 is formed, the sheathed optical cable 6 is fixed in parallel in the groove 4.

In the present disclosure, the sheathed optical cable 6 extends from two ends of the plain round Fe-SMA bar 5.

According to the present disclosure, the surface of the plain round Fe-SMA bar 5 is subjected to pretreatment preferably before the sheathed optical cable 6 is fixed in parallel in the groove 4. The pretreatment preferably includes sanding, washing, and drying carried out sequentially; the sanding is preferably carried out with sandpaper; the washing is preferably carried out with acetone; the temperature of drying is preferably from 30° C. to 40° C., more preferably 35° C.; and the time for drying is preferably from 3 h to 5 h, more preferably 5 h. In the present disclosure, rust stains are removed from the surface of the plain round Fe-SMA bar by pretreatment.

In the present disclosure, a method for the fixation includes: the sheathed optical cable 6 is fixed with adhesive tape, and then the groove 4 is encapsulated with glue. In the present disclosure, the adhesive tape is preferably transparent adhesive tape. The present disclosure has no special limitation on the glue, as long as the glue is well-known in the art. In the present disclosure, the fixation specially includes: the sheathed optical cable 6 is embedded in the bottom of the groove 4 of the plain round Fe-SMA bar 5, kept in a stretched state and fixed with the transparent adhesive tape to ensure the sheathed optical cable 6 is in place, and then glue is placed in the groove 4 to prevent the sheathed optical cable 6 from slipping with respect to the plain round Fe-SMA bar 5.

According to the present disclosure, segments, at two ends of the plain round Fe-SMA bar 5, of the groove 4 are not filled with glue preferably. After the glue is cured, the corrugated casings 7 are sleeved on two ends of the sheathed optical cable 6 and placed in the segments of the groove 4 without glue, respectively. In the present disclosure, each of the segments of the groove 4 without glue has a length preferably of 10 mm.

In the present disclosure, the corrugated casing 7 has a diameter preferably of 1 mm. The length of the corrugated casing 7 is preferably at least 20 mm shorter than that of the sheathed optical cable 6.

The preparation method according to the present disclosure preferably further includes: the corrugated casings 7 are sleeved on portions of the sheathed optical cable 6 that extends from the two ends of the plain round Fe-SMA bar 5 and placed in ends of the segments of the groove 4 without glue, respectively.

According to the present disclosure, the corrugated casings are sleeved on the two ends of the sheathed optical cable to prevent the sheathed optical cable from breakage at a large angle at the ends of the g plain round Fe-SMA bar with the groove. In addition, the corrugated casing 7 is also a conductive material, which may be used to connect a wire of the activation current.

According to the present disclosure, after the sheathed optical cable 6 is fixed in parallel in the groove 4, the plain round Fe-SMA bar 5 is wrapped with the epoxy resin composite fiber, and then fixation is performed to obtain the plain round Fe-SMA bar 5 wrapped with the FRP wrapping layer 8.

In the present disclosure, the epoxy resin composite fiber preferably includes fiber cloth impregnated with epoxy resin and a fiber bundle impregnated with epoxy resin; the fiber cloth is preferably carbon fiber cloth, glass fiber cloth or basalt fiber cloth, more preferably the carbon fiber cloth; and the fiber bundle is preferably carbon fibers, basalt fibers, glass fibers, aramid fibers or plant fibers, more preferably the carbon fibers.

The present disclosure has no special limitation on the type and amount of the epoxy resin, fiber cloth and fiber bundle, which can be determined according to the actual requirements.

In the present disclosure, the wrapping process preferably includes the plain round Fe-SMA bar 5 implanted with the sheathed optical cable 6 is covered with the fiber cloth impregnated with epoxy resin, and then the plain round Fe-SMA bar 5 is circumferentially wrapped with the fiber bundle impregnated with epoxy resin to form the FRP wrapping layer 8; where the circumferential wrapping is preferably carried out in the length direction of the plain round Fe-SMA bar 5, more preferably is carried out at 90 degrees in the length direction of the plain round Fe-SMA bar 5; and the direction of the carbon fibers in the carbon fiber cloth is the same as the direction of the plain round Fe-SMA bar. The present disclosure has no special limitation on the thickness of the fiber bundle impregnated with epoxy resin, which can be determined according to actual requirements, and the thickness of the fiber bundle impregnated with epoxy resin can be such as 1 mm, 2 mm.

In an embodiment of the present disclosure, the wrapping process specifically includes: the fiber cloth is brushed with epoxy resin, and the fiber cloth full impregnated with the epoxy resins is covered on the outer surface of the plain round Fe-SMA bar 5*h*, and fixation is performed; then the fiber bundle impregnated with epoxy resin is circumferentially wrapped on the plain round Fe-SMA bar 5 in the length direction of the plain round Fe-SMA bar 5 to form the FRP wrapping layer 8.

According to the present disclosure, after the plain round Fe-SMA bar 5 wrapped with the FRP wrapping layer 8 is obtained, the tight jackets 9 sleeve from the sheathed optical cable 6 and on two ends of the FRP wrapping layer 8.

In the present disclosure, the length of portion, sleeved with the tight jacket 9, of the end of the plain round Fe-SMA bar 5 wrapped with the FRP wrapping layer 8 is preferably at least 20 mm; the diameter of the tight jacket 9 is preferably 1 mm greater than the diameter of the plain round Fe-SMA bar 5 wrapped with the FRP wrapping layer 8; the sheathed optical cable 6 is preferably at least 50 mm longer than the tight jacket 9; and the corrugated casing 7 is preferably at least 30 mm longer than the tight jacket 9.

According to the present disclosure, the sheathed optical cable extend from ends of the tight jackets, so that the long sheathed optical cable is easy to be welded to an optical fiber patch cord.

The preparation method according to the present disclosure preferably further includes the tight jackets 9 are heated; and the heating is preferably carried out with a heat gun. According to the present disclosure, the tight jackets are heated to shrink so as to tightly cover the wrapping layer.

According to the present disclosure, after the tight jacket 9 sleeves from the sheathed optical cable 6, rib structures are arranged on the outer surface of the FRP wrapping layer 8 to obtain the optical-fiber-embedded and FRP-wrapped SMA composite bar.

In the present disclosure, the arranging of the rib structures preferably is wrapping the outer surface of the FRP wrapping layer 8 with the fiber bundle to form the rib structures.

According to the present disclosure, the surface of the plain round Fe-SMA bar is provided with a groove in advance to implant the sheathed optical cable, such that the plain round Fe-SMA bar has a self-sensing function, i.e., the plain round Fe-SMA bar is "smart", ensuring the control of prestress in its tensioning process and the monitoring of the loss of prestress during its normal use. The differences between the optical-fiber-embedded and FRP-wrapped SMA composite bar obtained and the traditional steel-continuous fiber intelligent bar are that: in the present disclosure, the plain round Fe-SMA bar is used as a steel core, which has a shape memory effect, i.e., it cannot recover by itself after pre-stretching at room temperature, but can be recovered after being activated at a specific heating temperature, which determines that the optical-fiber-embedded and FRP-wrapped SMA composite bar is self-driven. The fiber wrapped on the surface of the slotted plain round Fe-SMA bar implanted with the sheathed optical cable may form the FRP wrapping layer to prevent corrosion of the plain round Fe-SMA bar used as the core and fracture of the sheathed optical cable, thus improving durability of a prestressed bar. The rib structures on the surface of the FRP wrapping layer may provide sufficient engaging force and anchoring effect, thus achieving uniform distribution of prestress during the application of the prestress and reducing the loss of prestress due to friction and the like. Therefore, according to the present disclosure, the optical-fiber-embedded and FRP-wrapped SMA composite bar has the characteristics of being self-driven, self-sensing, and low loss of prestress, overcoming the defects of the existing steel-continuous fiber composite bar, such as great loss of prestress, low anchoring efficiency, low control precision of tensioning prestress, and complicated construction, so that it is a stress material applicable to the application of prestress and the monitoring of the loss of prestress of various complex engineering components. Moreover, according to the present disclosure, the optical-fiber-embedded and FRP-wrapped SMA composite bar is resistant to corrosion, has high strength and high precision, is easy to construct, can be applied in engineering, and is suitable for large-scale promotion.

The present disclosure further provides an application of an optical-fiber-embedded and FRP-wrapped SMA composite bar according to the above technical solutions or an optical-fiber-embedded and FRP-wrapped SMA composite bar prepared by a preparation method according to the above technical solutions in a prestressed concrete structure.

In the present disclosure, the application preferably refers to: according to the design requirements of bearing capacity and crack width, the optical-fiber-embedded and FRP-wrapped SMA composite bar is arranged at a key portion of the prestressed concrete structure; the obtained prestressed concrete structure is cured for age thereof, an activation current is applied to heat the optical-fiber-embedded and FRP-wrapped SMA composite bar to activation temperature of the plain round Fe-SMA bar, the optical-fiber-embedded and FRP-wrapped SMA composite bar is self-driven to produce prestress at the activation temperature of the plain round Fe-SMA bar, and then is cooled to room temperature after the activation current is removed; the sheathed optical cable monitors changes in prestress of the optical-fiber-embedded and FRP-wrapped SMA composite bar during heating and cooling; and it is determined whether the prestressed concrete structure is health according to whether the resulting prestress change can meet the requirements of the tensioning control stress of the prestressed concrete structure.

In the present disclosure, the activation temperature of the plain round Fe-SMA bar 5 is preferably lower than the glass transition temperature of the FRP wrapping layer 8; the activation temperature of the plain round Fe-SMA bar 5 is preferably from 50° C. to 150° C., more preferably from 80° C. to 120° C. In the present disclosure, the activation temperature of the plain round Fe-SMA bar 5 needs to be determined according to the glass transition temperature of the FRP wrapping layer which usually is from 50° C. to 150° C. In order to ensure that the FRP wrapping layer has a sufficient strength during heating, the activation temperature of the plain round Fe-SMA bar is lower than the glass transition temperature of the FRP wrapping layer.

In the present disclosure, a method for adjusting the activation temperature preferably includes connecting the positive and negative electrodes of a DC power supply heating system to the corrugated casings at the two ends of the plain round Fe-SMA bar, respectively, applying the activation current, monitoring the average strain and temperature changes of the inside of the plain round Fe-SMA bar by means of the sheathed optical cable, controlling the current to enable the internal temperature of the plain round Fe-SMA bar to be less than a maximum activation temperature $T_{max}$, stopping heating when the monitored stress of the plain round Fe-SMA bar is equal to the tensioning control stress, where the stress is equal to the average strain multiplied by the elasticity modulus of the plain round Fe-SMA bar.

FIG. 8 is a relationship diagram of glass transition temperature of ERP and activation temperature when conditions are met. As shown in FIG. 8, the glass transition temperature of FRP is from 50° C. to 150° C. As the temperature increases, the resin softens, the anchoring effect of the smart bar decreases, and the error in self-driven elongation recovery and optical fiber monitoring increases. The maximum activation temperature $T_{max}$ ensures that the error precision in the designed self-driven elongation and self-sensing of the smart bar is within 15%. Therefore, the activation temperature should be less than the maximum activation temperature $T_{max}$. The $T_{max}$, glass transition temperature, designed elongation, and measurement error are determined based on specific parameters of materials such as epoxy resin, optical fiber, and Fe-SMA.

FIG. 9 is a relationship diagram of glass transition temperature of FRP and activation temperature when conditions are not met. In the case that the maximum activation temperature does not meet the self-sensing monitoring precision and the designed self-driven elongation, the present disclosure preferably uses the large-resistance coating 10 to replace the FRP wrapping layer 8 arranged in the middle of the plain round Fe-SMA bar 5.

The present disclosure has no special limitation on the application of the optical-fiber-embedded and FRP-wrapped SMA composite bar in a prestressed concrete structure, as long as the application method is well-known in the art.

FIG. 10 is a flow chart of the preparation and application of an optical-fiber-embedded and FRP-wrapped SMA composite bar in the present disclosure. As shown in FIG. 10, in the present disclosure, the plain round Fe-SMA bar used as the core is pre-tensioned, slotted, embedded with an optical fiber sensor, and then wrapped with an outer FRP, and finally wrapped with outer FRP ribs, to obtain the optical-fiber-embedded and FRP-wrapped SMA composite bar. The application process of the optical-fiber-embedded and FRP-wrapped SMA composite bar in the structure includes: it is arranged at the key portion of the structure according to the design requirements, a building specimen is cured for the age thereof, an activation current is applied, the optical-fiber-embedded and FRP-wrapped SMA composite bar generates prestress, and then is cooled to room temperature, and the fiber optic sensor monitors whether the applied prestress meets the tensioning control stress.

The technical solutions in the present disclosure will be described clearly and completely below in conjunction with the embodiments of the present disclosure, but these embodiment are not to be construed as limitations on the scope of protection of the present disclosure.

Example 1

A plain round Fe-SMA bar is pre-tensioned according to the designed pre-tensioning strain, and the elongation of the pre-tensioned plain round Fe-SMA bar is 3%. A square groove of 1 mm×1 mm is formed in the plain round Fe-SMA bar in a length direction of the plain round Fe-SMA bar by means of a metal grooving machine. Rust stains on the outer surface of the slotted plain round Fe-SMA bar are removed by sandpaper, the slotted plain round Fe-SMA bar used as the core is washed with acetone, and is dried at 35° C. for 5 h; a sheathed optical cable (with a diameter less than 0.9 mm, consisting of a glass fiber core, a polyimide coating and a polyurethane covering layer that are nested from inside to outside) is embedded in the bottom of the groove of the plain round Fe-SMA bar and kept strained, and is fixed by transparent adhesive tape to ensure that it is in place; then the groove is filled with glue to prevent the sheathed optical cable from slipping with respect to the plain round Fe-SMA bar. After the sheathed fiber cable is implanted, a portion, having a length within 10 mm, of each end of the slotted plain round Fe-SMA bar is not filled with glue; corrugated casings each having a diameter of 1 mm and at least 20 mm shorter than the sheathed optical cable sleeve from two ends of the sheathed optical cable and are placed in the ends of the segments of the groove without glue to prevent the sheathed optical cable from breakage at a large angle at the ends of the slotted plain round Fe-SMA bar. The fiber cloth is brushed with epoxy resin, and after it is full impregnated with epoxy resin, the carbon fiber cloth is covered on the outer surface of the plain round Fe-SMA bar used as a core to form a plain round bar. The direction of carbon fibers in the carbon fiber cloth is the same as the direction of the plain round Fe-SMA bar. After fixation is performed, a carbon fiber bundle impregnated with epoxy resin is circumferentially wrapped in the length direction of the Fe-SMA bar at 90 degrees, to form the plain round Fe-SMA bar wrapped with an FRP wrapping layer (with a thickness of 2 mm). Two ends of the sheathed optical cable are sleeved with tight jackets with a diameter of 1 mm greater than that of the Fe-SMA bar wrapped with the FRP wrapping layer, and the length of portion, sleeved with the tight jacket, of each end of the plain round Fe-SMA bar wrapped with the FRP wrapping layer is 20 mm; the tight jacket is at least 50 mm shorter than the sheathed optical cable, which facilitates the later welding between the sheathed optical cable and an optical fiber patch cord; the corrugated casing is at least 30 mm longer than the tight jacket, which is convenient to be connected to a wire of the activation current; and finally the tight jackets are heated by means of a heat gun so that the tight jackets shrink. In order to ensure the anchoring efficiency of the bar and concrete in the tensioning process and reduce the loss of prestress, rib structures are formed by wrapping fiber bundles on the outer surface of the FRP wrapping layer 8, where the rib structure has a width of 5 mm, a height of 2 mm, and a spacing between adjacent rib structures is 5 mm, and thus the optical-fiber-embedded and FRP-wrapped SMA composite bar is obtained.

Example 2

Example 2 differs from Example 1 in that a portion of the plain round Fe-SMA bar 5 which is located in the middle of the plain round Fe-SMA bar 5 has a length of 50 mm, and is not covered with the FRP wrapping layer 8 and is coated with a large-resistance coating 10 in place of the FRP wrapping layer 8; the thickness of the large-resistance coating is 15 μm; and the large-resistance coating preferably is made of a graphene carbon nanotube composite water-based conductive material (TF-H-001, purchased from Suzhou Tanfeng Graphene Technology Co. Ltd), and the rest of the contents are consistent with Example 1.

Although the above embodiments provide an exhaustive description of the present disclosure, they are only a part of the embodiments of the present disclosure rather than all of the embodiments, persons may obtain other embodiments based on the present embodiments without creativity, and all of these embodiments fall within the scope of protection of the present disclosure.

What is claimed is:

1. An optical-fiber-embedded and fiber-reinforced polymer (FRP)-wrapped shape memory alloy (SMA) composite bar, comprising:
   a sheathed optical cable, a plain round Fe-SMA bar, a FRP wrapping layer, and tight jackets; wherein
   the sheathed optical cable comprises a glass fiber core, a polyimide coating and a polyurethane covering layer that are nested from inside to outside;
   the plain round Fe-SMA bar is provided with a groove in a length direction thereof; the sheathed optical cable is embedded in parallel in the groove;
   the FRP wrapping layer is wrapped around an outer surface of the plain round Fe-SMA bar, and the FRP wrapping layer is made of an epoxy resin composite fiber;
   the tight jackets comprise a first tight jacket and a second tight jacket that respectively sleeve at positions where the FRP wrapping layer and two ends of the sheathed optical cable are jointed;
   rib structures are formed on an outer surface of the FRP wrapping layer;

each of the rib structures is formed by wrapping of a fiber bundle, and has a width of 5 mm, a height of 2 mm and a spacing between adjacent rib structures is 5 mm;

the optical-fiber-embedded and FRP-wrapped SMA composite bar further comprising:

anchoring members provided at ends of the optical-fiber-embedded and FRP-wrapped SMA composite bar to replace the rib structures, the anchoring members are steel sleeve anchoring members; and a portion of the plain round Fe-SMA bar which is located in a middle of the plain round Fe-SMA bar, has a length of 50 mm and is not covered with the FRP wrapping layer, the portion not covered with the FRP wrapping layer being coated with a large-resistance coating in place of the FRP wrapping layer; wherein a thickness of the large-resistance coating is 15 μm; and the large-resistance coating is made of a graphene carbon nanotube composite water-based conductive material.

2. The optical-fiber-embedded and FRP-wrapped SMA composite bar according to claim 1, wherein the sheathed optical cable has a diameter of less than 1 mm.

3. The optical-fiber-embedded and FRP-wrapped SMA composite bar according to claim 1, wherein a length of the sheathed optical cable is greater than a length of the plain round Fe-SMA bar, the sheathed optical cable extends from two ends of the plain round Fe-SMA bar, and portions, extending from the two ends of the plain round Fe-SMA bar, of the sheathed optical cable are sleeved with corrugated casings.

4. The optical-fiber-embedded and FRP-wrapped SMA composite bar according to claim 1, wherein the groove is a square groove of 1 mm×1 mm.

* * * * *